United States Patent [19]

Buchmann

[11] 4,432,338
[45] Feb. 21, 1984

[54] STACKABLE MULTI-PURPOSE HEATER WITH CONTROLLABLE HEAT ACTION

[76] Inventor: Rudolf C. Buchmann, Battertweg 1, Baden-Baden, Fed. Rep. of Germany

[21] Appl. No.: 380,848

[22] Filed: May 21, 1982

[30] Foreign Application Priority Data

May 26, 1981 [CH] Switzerland .................. 3436/81

[51] Int. Cl.³ .................. F24C 5/04; A47G 23/02
[52] U.S. Cl. .................. 126/256; 126/260; 248/152
[58] Field of Search .................. 126/40, 30, 9 B, 39 H, 126/39 K, 50, 215, 214 D, 260, 256, 252, 38; 248/152, 146, 310

[56] References Cited

U.S. PATENT DOCUMENTS

| | | | |
|---|---|---|---|
| 162,959 | 5/1875 | Sickels | 126/38 |
| 1,048,177 | 12/1912 | Kohloff | 126/252 |
| 1,224,623 | 11/1917 | Ferguson | 126/256 |
| 2,814,286 | 11/1957 | Arnold | 126/260 |
| 4,134,385 | 1/1979 | Barten | 248/152 |

FOREIGN PATENT DOCUMENTS

| | | | |
|---|---|---|---|
| 30703 | of 0000 | Switzerland | 126/38 |
| 103089 | 1/1924 | Switzerland | 126/260 |

Primary Examiner—Samuel Scott
Assistant Examiner—G. Anderson
Attorney, Agent, or Firm—Flynn, Thiel, Boutell & Tanis

[57] ABSTRACT

A heater on which a food plate can be supported includes a frame having three arms with holding hooks thereon which grip the food plate and includes, in the center of the frame, a heating candle. A spacing support is provided on the frame and supports a ring provided on an adjacent heater frame during vertical stacking of the heaters. An apertured plate is pivotally supported on the frame. The apertured plate can be swung out of the inner region of the frame, whereby stacking of the heaters is facilitated. The frame also supports a wind-guard member disposed around the candle. A protective member is preferably provided around the apertured plate. A supplemental device can be mounted on the frame to grip plates larger than can be gripped by the holding hooks.

14 Claims, 8 Drawing Figures

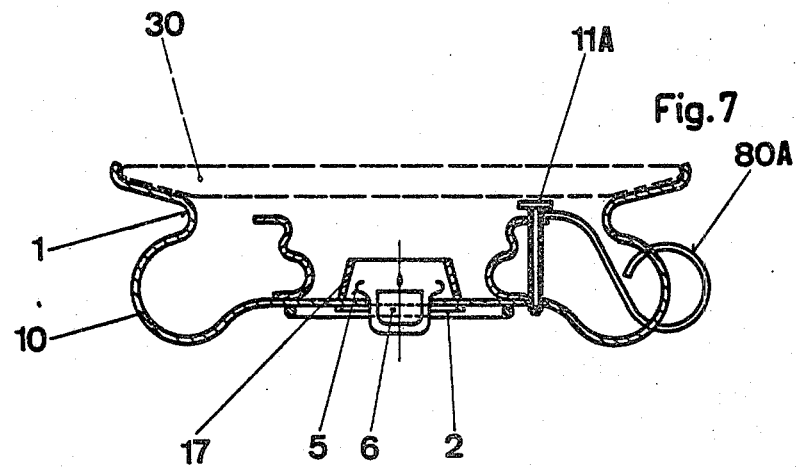
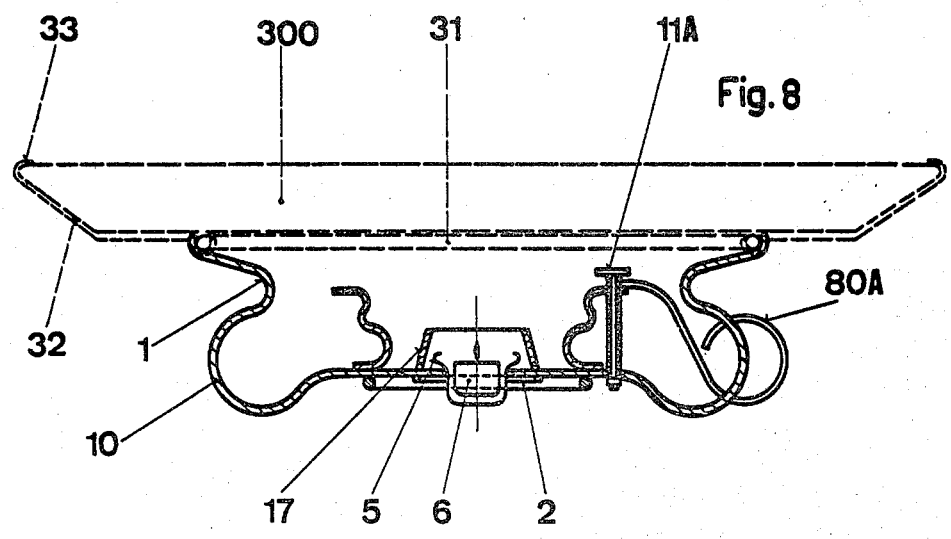

STACKABLE MULTI-PURPOSE HEATER WITH CONTROLLABLE HEAT ACTION

FIELD OF THE INVENTION

This invention relates to a stackable multi-purpose heater and, more particularly, to a heater having at least one heat source and a mechanism for controlling the heat applied to the bottom of a food carrier, and having a support frame for the food carrier and heat source.

BACKGROUND OF THE INVENTION

A heater of this type is often used to hold a food carrier during serving or cleaning or while being eaten from or cooked on, and also positions the food carrier relative to the heat source and to a bearing surface, for example a table surface.

A heater of the mentioned type has become known through Swiss Patent No. 404 910. It consists substantially of a support frame for a food carrier and a heat source arranged a certain distance below the food carrier to assure optimum heat transmission.

Problems which occur when using the aforementioned heater arise in part because the heating means which are used, for example candles which are commonly called tea lights, cannot be adjusted or regulated in and of themselves with respect to the amount of heat produced, as can regulatable electrical heating plates. In addition, the flame intensity which exists when a candle is first lit and which is theoretically supposed to be continuous for a typical burning duration of approximately 30 to 40 minutes is in practice influenced by two factors. First, the amount of the wax feeding the flame is reduced with time, and second, the condition of the wick changes. The latter can be due to a natural burning off or, as is important to the invention, to breaking or bending of the wick during handling of the candle between uses.

In order to assure after repeated use a flame with sufficient heat, appropriate initial conditions with respect to the wick could be chosen during design, but this leads to a very strong initial flame intensity.

In the case of the usual serving heaters having relatively large serving plates on which foods are kept warm during the first and second offerings, a heat action which is initially too strong is of no great importance, since the good capability for heat conduction in the serving plates, which typically consist of metal, assures a broad surface distribution.

Compared with this, a flame intensity which is initially too high in so-called plate service heaters is unfavorable in many respects. Here, eating takes place directly from poor heat-conducting ceramic or glass plates, whereby only a small zone in the center of the plate which is approximately 10 cm in diameter is heated. If this zone becomes too hot, due to the flame action, there is a danger that the foods thereon will be overheated or burned or that the plate itself will break. Furthermore, there is the possibility that a fork which rests for a short time in the center of the plate will be heated up sufficiently to cause uncomfortable burning of the lips. Moreover, with respect to the desire to eat food warm, there are different individual opinions concerning the degree of heat which is appropriate.

To resolve all of this, it has already been suggested that the heat source can be arranged so that its distance from the bottom of the plate can be varied. However, this requires the provision of extra vertical space for effecting the adjustment, and thus results in an increased vertical height for the heater and food plate thereon, as a result of which the user must relinquish a normal eating position.

A further known suggestion is to arrange an apertured sheet-metal plate between the candle flame and the bottom of the food plate, the apertured plate preventing the flame from acting directly onto the food carrier. This device prevents localized overheating during use of regulatable heat sources, but during use with candles, which is common up to 90% of the time, the disadvantage had to be accepted that, for example in the case of candles which had been used already several times, changes in the flame action can occur due to the burning off of the wick and the heat which is then produced is sometimes insufficient to pass the apertured plate. To compensate for this, and as a type of make-do solution, one can remove the apertured plate while eating, but only by first removing the food plate from the heater, which is a disadvantage.

Independent of the handling difficulties associated therewith, the use of apertured sheet-metal plates has also resulted in two further problems. First, if after use the food plates are removed from the frames but the candles are not removed, the candle wicks are subjected to the danger of breaking off during space-saving vertical stacking of the heaters and thus become unusable, possibly after only one use. However, if the apertured plates are not removed, then the frames cannot be efficiently stacked in and above one another.

To eliminate these described disadvantages, a control mechanism is needed which permits a user to carry out with a minimum apparatus height an adjustment of the amount of heat applied from the heat source to the food carrier according to individual desires without having to remove the food carrier during eating and, moreover, permits vertical stacking of the heaters in an efficient manner.

Difficulties which stand in the way of this objective include, for the main purpose of use of the heaters, to serve as very flat vertically low heat-providing means during eating or cooking at the table, minimal space remains between the flame and plate bottom. In addition, the releasable interconnection between the food carrier and heater frame, which is necessary for secure handling of the combined frame and food carrier, does not permit utilization of a control mechanism in which the plate, for example a heated metal plate, must be removed from the frame or which, due to its structure, requires a large amount of space.

Moreover, the use of the heater, for example in a busy restaurant, must be easy to handle during clearing of tables. The individual heaters, after removal of the plates and in spite of the heat-controlling mechanism and inserted candles, are to be space-savingly stackable on one another and preferably into one another, so that they stay together as a whole and can be used again.

SUMMARY OF THE INVENTION

The foregoing objects and purposes of the invention are met by providing a heater of the aforementioned type wherein the support frame and the food carrier can be releasably interconnected and the apertured plate is supported on the frame for movement within a range bounded by first and second positions, the apertured plate being between the heat source and the food carrier in the first position, and spaced from the open flame and out of the inner frame region in the second position. The apertured plate has a handle thereon for manually operating it, and the heater includes a mechanism for maintaining the apertured plate in a selected position along its range of movement. The heater is stackable in a space-efficient manner with like units when the apertured plate is in the second position.

The apertured plate, which is arranged for movement to and from the position between the food carrier bottom and the flame, is constructed so that it can be adjusted to totally or partially expose or shield the food carrier from the flame of the heat source. Moreover, adjustment of the apertured plate can be effected by the user while eating, without removing the plate from the frame.

In order to simplify, during movement of the apertured plate, the task of searching for the correct position, the apertured plate can be pivotally supported on the heater frame, and to facilitate locating the fully "on" and "off" positions, the pivotal support and/or the arm supporting the apertured plate can be provided with stops. The apertured plate can be moved to any desired position by means of a handle which is visible and grippable under the outer plate surface. In order to achieve a better refinement of the heat control, it is advantageous to provide the apertured plate with openings of different sizes and arrangement and to cover these, if desired, with a wire screen. The apertured plate can then be swung to positions in which respective openings are disposed above the flame, whereby, depending on the size of each such opening, varying degrees of flame action on the bottom of the plate can be achieved.

The apertured plate which is swung over the flame naturally heats up. In order to avoid, due to clumsy manipulation of the apertured plate handle, burning of the user's hand or the back of the hand, it is advantageous to provide around at least a portion of the apertured plate a protective member which is not directly connected in a heat conductive manner to the apertured plate and which preferably is either made of a material which is difficult to heat up or is covered with such a material.

It is furthermore an important characteristic of the invention that the mechanism supporting the apertured plate on the frame is designed so that the apertured plate can be moved farther than necessary for heat control to a position which facilitates stacking of the heaters, and to construct it so that the relative positions of the stacked heaters are determined.

For a space-saving stacking without any danger of damage to the wicks of the candles, the frames each preferably have three spacing supports which, through their special shape and through cooperation with a further frame part, ensure that the distance between the frames in the stack is always the same and is such that the candle holders can be left in the frames with sufficient distance therebetween to prevent wick damage. Moreover, by means of the resilience of the spacing supports, a simple, releasable connection can be created between an upper part of the frame and a part on an adjacent frame for example a ring provided on the lower part of the frame thereabove so that, without auxiliary parts, a stack is created which contains, for example, 24 heaters, and in each case the necessary number of heaters can be lifted off together or individually.

The advantage of this arrangement is recognizable if one considers that, during large dinners with several hundred persons, by means of this solution the serving personnel need not handle individual heater parts during serving and table clearing, since aside from the removed food plates, the parts of each heater remain together as a functional unit.

A further characteristic of the invention consists in the spacing supports which facilitate stacking being constructed so that they simultaneously permit multipurpose use of the frames, in that they also serve as support parts for coffee or tea pots which are set thereon. The horizontal inwardly and outwardly swingable apertured plate can be utilized not only for heat control, but simultaneously for supporting small pans.

If the heater having frame arms which are adjusted for gripping a certain food plate size is also to be used with food plates which are, for example, twice as large in diameter, then an additional part is provided. This additional part has the shape of a ring, the diameter of which is chosen so that it fits like a normal food plate into the clamp mounting. The large food plates are held and positioned on this ring by gripping members which are secured on the ring and are arranged to have at least some capacity to be tensioned so as to grip the plate.

BRIEF DESCRIPTION OF THE DRAWINGS

Exemplary embodiments of plate heaters embodying the subject matter of the invention are illustrated in the drawings.

In the drawings:

FIG. 7 is a fragmentary sectional view of one of the heaters of FIG. 4 with a food plate inserted; and FIG. 8 is a sectional view similar to FIG. 7 of the heater of FIG. 7 with a relatively large food plate supported thereon.

DETAILED DESCRIPTION

Figure 1:
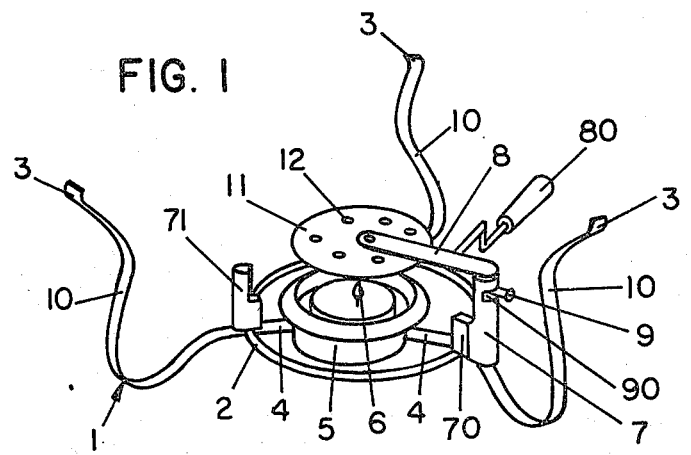
FIG. 1 is a perspective view of a plate heater having an apertured plate in a position shielding a candle flame.

Similar parts are provided with similar reference numerals throughout the figures. Where reference is made to a food carrier or plate, the term is to be interpreted broadly so as to include any food or drink carrier, such as a plate, a can, a pan, a bowl or the like.

Reference numerals 10 identify in FIG. 1 each of three slightly flexible frame arms which are parts of a support frame 1 of a heater, are each made of a strip of metal bent to the shape shown in FIG. 1 and are secured in a conventional manner to a stacking ring 2.

The upper outer ends of the flexible arms 10 have inwardly directed retaining hooks 3 which can grip over the edge of a not illustrated food plate, thereby holding the food plate through the resilience of the arms 10 and positioning the plate relative to a heating candle 6 which is provided in a container 5 supported by the inner ends 4 of the frame arms 10.

Figure 2:
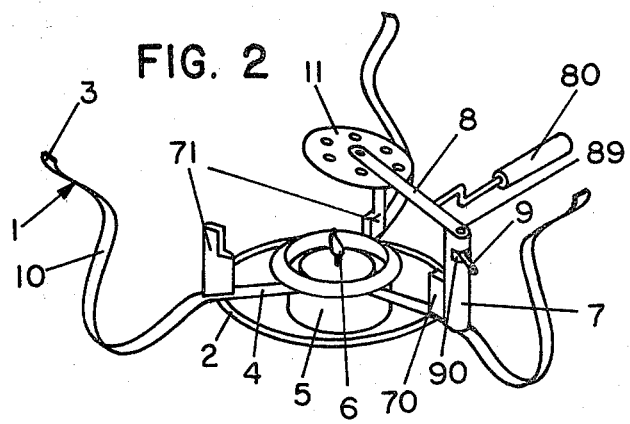
FIG. 2 is a perspective view of the heater of FIG. 1 with the apertured plate swung horizontally outwardly to a position spaced from the flame.
Figure 3:
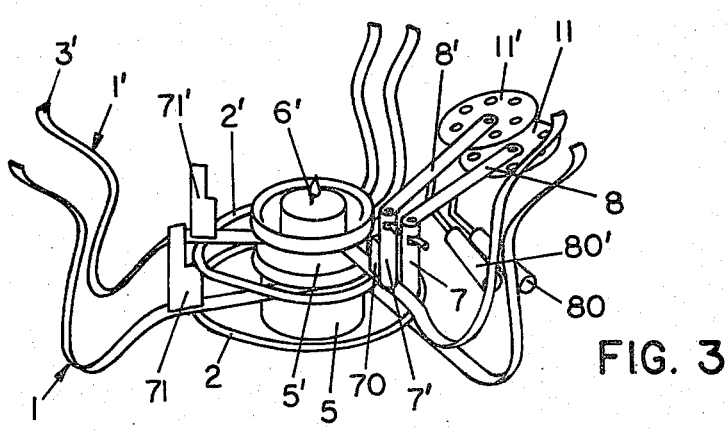
FIG. 3 is a perspective view of two of the heaters of FIG. 1 in a stacked relationship, the apertured plates being fully swung out.

Referring to FIGS. 1 to 3, reference numeral 7 is a sleeve 7 which movably supports a pivot pin 89 and is welded to a swivel arm 8, the pin 89 being retained in the sleeve 7 by means of a pin 9 thereon which is slidably received in a slot 90 provided in a wall of the sleeve 7. The pin 9 and slot 90 cooperate to limit the range of pivotal movement of the apertured plate 11 and at one limit position, the apertured plate is preferably directly above the candle 6.

The axial length of the pivot pin 89 is approximately half that of the sleeve 7, and the pin 9 is pressed upwardly against the upper edge of the slot 90 by a compression spring which is disposed in the lower part of the sleeve 7, below the pin 89, and urges the pin 89 upwardly, causing the swivel arm 8 to tend to remain in any position in which it is placed manually by means of the handle 80, due to friction between slot 90 and pin 9.

Provided at the end of the swivel arm 8 is a plate 11 having holes 12 therein, which apertured plate 11 can, if desired, be covered with wire mesh.

The apertured plate 11 is illustrated in FIG. 2 with the swivel arm 8 rotated approximately 45° about the pin 89 from the position of FIG. 1. The candle flame is not covered in this position, so it can act freely onto the underside of a food plate placed on the heater.

FIG. 3 illustrates two of the heaters of FIG. 1 in a stacked relationship. The heaters are rotated approximately 5° with respect to one another, the swivel arm 8 of each having the handle 80 thereon being rotated approximately 90° relative to the position thereof shown in FIG. 1, the pin 9 preferably being at an end of the slot 90. In this stacked relationship, the upper heater sits so that its stacking ring 2' rests on a spacing support 70 which is secured in a conventional manner to the sleeve 7 and on the steps of two stepped spacing supports 71 which are secured on respective frame arms 10, thereby holding the upper heater a small distance above the candle 6 of the lower heater and laterally centered over the lower heater. Due to the capability of the apertured plate 11 to swing outwardly, approximately 36 cm of stack height is saved in the case of a stack of twelve heaters as compared to known heaters.

Figure 4:
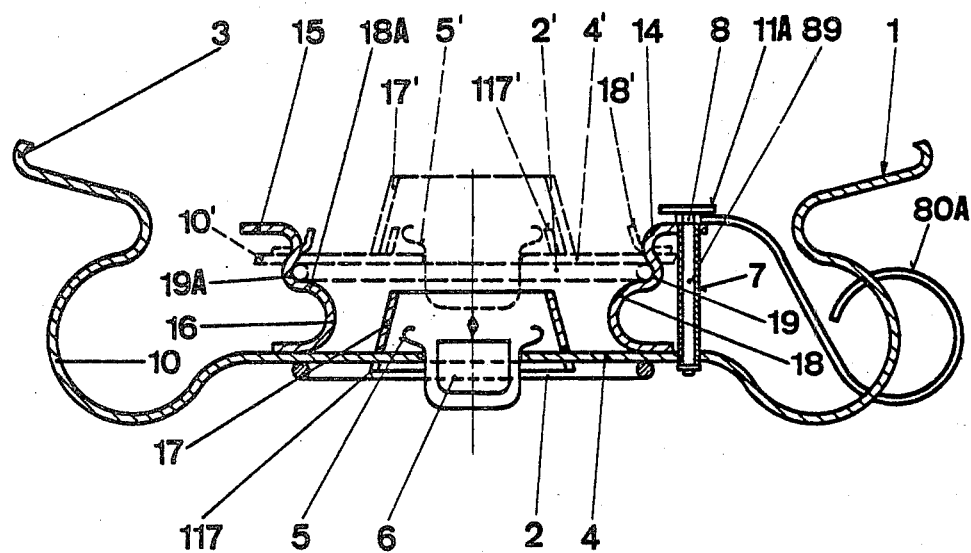
FIG. 4 is a fragmentary sectional view of two heaters which are similar to the heater of FIG. 1 in a stacked relationship, the upper heater being shown in broken lines, thus illustrating the principle of stacking the heaters and the simultaneous releasable interconnection of the heaters.

Two heaters which are very similar to the heater of FIG. 1 are stacked in FIG. 4, the upper heater being shown only in part and in broken lines. The reference numerals of the upper heater are the same as the lower heater but with a prime (') added.

Spacing supports 18 and 18A are defined in this embodiment by flexible strips of steel which are each bent to form approximately a double S. The lower part 16 is the same height in each support 18 and 18A, but the upper part 15 of each of the supports 18A is of slightly greater height than the upper part 14 of the support 18, which supports the sleeve 7 and pivot pin 89 for the apertured plate 11A.

The supports 18 and 18A have respective outward bulges 19 and 19A in the region where the upper and the lower parts thereof merge, which bulges can receive the ring 2' of the upper heater. The upper parts 14 and 15 of the supports 18 and 18A project slightly inwardly just above the bulges 19 and 19A so that the ring 2' snaps into the recesses defined by the bulges. The lower parts 16 project inwardly slightly farther than the upper parts, and thus form horizontal parts which can support a small pan or food plate. The snapping of the ring 2' into the bulges 19 and 19A of the supports 18 and 18A makes it possible to stack many heaters on one another in a releasably interconnected manner. The resulting stack is sufficiently stable so that it can be lifted and transported.

To facilitate use of the tops of the supports 18 and 18A as bearing surfaces for food plates while simultaneously using support 18 to support the pivot pin 89 and the heat apertured plate 11A, the supports 18A are constructed with a slightly greater height than the support 18 which supports the axis 89, the latter being shorter by the thickness of the apertured plate support arm 8. With this, it is achieved that, when the supports are utilized as a base for a food plate, all the supports have support surfaces at equal heights.

The pivot pin 89 for the swivel arm 8A and apertured plate 11 is supported in the sleeve 7. Secured on this pivot pin 89, approximately at a right angle to the swivel arm 8A, is a handle 80A, with which the apertured plate 11A can be moved about the axis of the pin 89. The handle 80A advantageously projects laterally beyond the frame arms 10 so that, when a user operates the handle 80A to move the apertured plate, his or her hand does not come into contact with the hot frame arms 10 or the plate 11A. A positioning stop can be arranged on the frame for cooperation with the swivel arm 8A or the handle 80A, or alternatively an arrangement similar to the pin 9 and slot 90 of FIG. 1 can be provided.

The position of the sleeve 7 and pivot pin 89 is chosen on the frame 1 so that the apertured plate 11 can be swung out of the frame area to facilitate a space-saving stacking of the heaters above and into one another. Each stacked heater is rotated slightly relative to the heater therebelow, if any, so that the frame arms of adjacent heaters are adjacent.

A wind-guard member 17 is arranged around each of the heating candles 6 and 6' and has a frusto-conical shape. This member 17 is in particular utilized during use of the heater outdoors so that the flame of the candle 6 does not flicker or go out. As illustrated by the upper heater in FIG. 4, the wind-guard member 17' is supported by the inner ends 4' of the frame arms 10'.

To stack two heaters, the member 17 of the lower heater is rotated until the arm ends 4 are aligned with and enter angularly spaced slots 117 provided in the lower edge of the member 17. The wind-guard member 17 is thereby lowered somewhat relative to the frame and thus does not hinder the stacking of the heaters.

In all embodiments, the apertured plate which can be swung over the candle may have any appropriate shape, but it is advantageous if the apertured plate is not compact.

Figure 5:
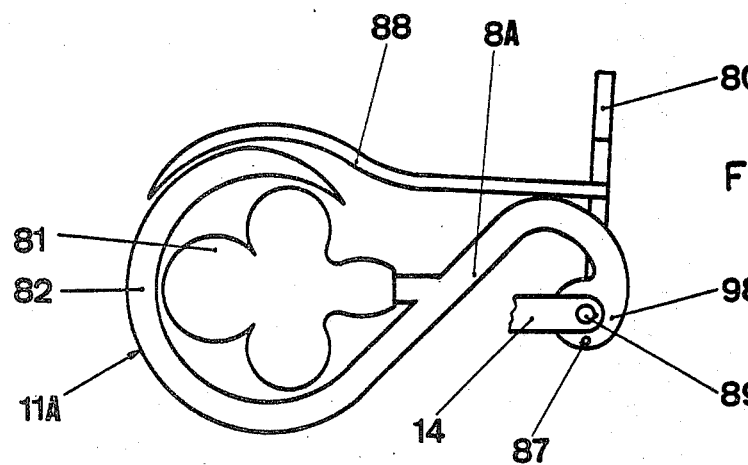
FIG. 5 and FIG. 6 are respectively top and end views of an alternative embodiment of an apertured plate having a member which protects against the burning of fingers, and illustrates the pivotal support of the apertured plate.
Figure 6:
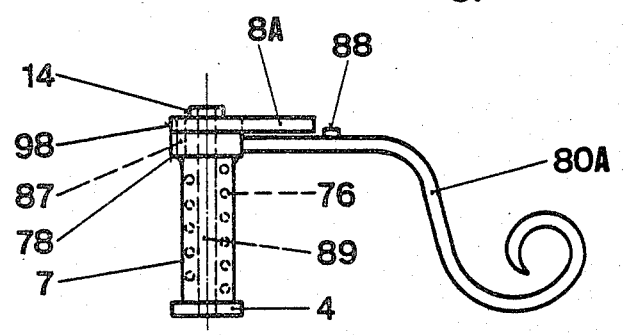

FIGS. 5 and 6 illustrate an apertured plate 11A in the form of a lily 81 and an outer frame 82 which transfers over into an apertured plate swivel arm 8A and is made, for example, of brass, bronze, or another common heat-conducting material. The inner end 98 of the arm 8A is rotatably supported on the pivot pin 89. Also, the sleeve 7 sits rotatably on the pivot pin, a collar 78 being arranged on the upper end of the sleeve 7. The end 98 of arm 8A and collar 78 are fixed against rotation with respect to one another by a pin 87 extending through openings therein, whereby the sleeve 7, the collar 78 thereon and the arm end 98 are, as a unit, rotatable about the pivot pin 89, which pin is secured at one end in the upper part 14 of stack support 18 and at the other end in the inner end 4 of a frame arm 10.

The handle 80A is fixedly connected to the collar 78 and in turn supports the protective arm 88. The arm 88 lies between the handle 80A and the apertured plate 11A and extends along the outer contour of the apertured plate 11A, so that it prevents unintended contact by a user with the apertured plate 11A during manual operation of the handle 80A.

Since apertured plate 11A, apertured plate swivel arm 8A, arm end 98, collar 78 on sleeve 7, handle 80 and protective arm 88 are fixedly connected and are positioned rotatably on the pivot pin 89, the apertured plate 11A and the protective arm 88 simultaneously follow movement of the handle 80A. Heat transfer onto the protective arm 88 through conduction does not occur, since collar 78 on sleeve 7, handle 80A, and protective arm 88 are of iron and form a large mass or surface, which results in a relatively large heat radiation.

Instead of a lily, the apertured plate could also be a stylish cross or emblem, for example that of a restaurant chain using the heater.

By varying the position of the apertured plate 11A between the flame and food carrier, the heat from the flame which acts onto the food carrier can be regulated. The various heat regulating positions are defined by the respective degree of swivelling of the apertured plate away from the position fully covering the flame and the position fully spaced from same. If an apertured plate of greater diameter or oval shape is used, small holes may be arranged on one side and larger ones on the other side of the plate, which enables a variable distribution of the heat by swivelling the apertured plate over the flame. To hold the apertured plate 11A in a desired position, a spring 76 (FIG. 6) is arranged coaxially in the sleeve 7 of the swivelling device and around the pin 89, the pressure of the spring 76 acting as a brake to resist inadvertent movement of the apertured plate 11A, whereby with the upper end the spring 76 presses against the underside of the end 98 of the swivelling arm 8A and with the lower end against the stationary end 4 of a frame arm.

According to FIG. 7, a plate 30 of normal size is firmly held between the holding hooks 3 of the frame arms 10 of the frame 1, which arms have some flexibility.

If a food plate 300 of larger diameter is to be supported on the heater, then a supplemental part is used which includes a ring 31 which is firmly held by the holding hooks 3 of the frame arms 10. Two to five gripping members 32 are fixed on the ring 31, each being a resilient bar having at the end thereof a hook 33 which grips the edge of the plate 300. In the case of a food plate which is designed specifically for use with the heater, it is possible to secure the ring 31 directly to the underside of the food plate.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a stackable, multi-purpose heater having at least one open flame heat source which is adapted to apply heat to the bottom surface of a food carrier such as a food plate; means for controlling the heat from the heat source, including a movable apertured plate; and a support frame for supporting the heat source and the apertured plate, said support frame being further adapted to support the food carrier, the improvement comprising wherein the support frame includes means for facilitating a releasable connection between the support frame and the food carrier; wherein for the regulation of the heat from the open flame acting onto the food carrier, the apertured plate is supported for movement to and from a position between the heat source and the food carrier by apertured plate support means on the support frame, the apertured plate further having a handle; and wherein the apertured plate support means provides the apertured plate with a fixed range of movement and tends to maintain the apertured plate in a desired position, the apertured plate being movable to a position spaced from the open flame heat source so that the heater, when the food carrier has been removed, can be stacked with like units without interference by the apertured plates and said apertured plate support means.

2. The heater according to claim 1, wherein said apertured plate support means includes a double lever which is pivotally supported on the support frame, a first arm thereof carrying the apertured plate and a second arm thereof being the handle.

3. The heater according to claim 2, wherein a protective member is provided adjacent the apertured plate on a side thereof facing the handle, the protective member being one of a part of the apertured plate, a part of the first lever arm, and a supplemental part supported on the first lever arm, and wherein the protective member is spaced from and extends at least partially around the apertured plate and serves to protect a user against burns due to unintended contact with the apertured plate.

4. The heater according to claim 1, including spacing supports arranged on one of the support frame and a part of the support means, the spacing supports being used to fix, during stacking of several said support frames having the heat sources thereon, the vertical spacing of the support frames with respect to one another and to limit the capability for lateral movement of the support frames with respect to one another.

5. The heater according to claim 4, including three upwardly directed said spacing supports which extend higher than the heat source, and including a ring arranged below the heat source on the support frame, the ring on one said heater, during stacking of the support frames, engaging the spacing supports on a second said heater therebelow so that a container for the heat source of the one heater does not rest on the heat source of and does not project into a container for the heat source of the second heater.

6. The heater according to claim 5, wherein the spacing supports each have a step thereon at a level which is at least as high as the level of the container for the heat source, and receive in such step the ring of a said heater stacked immediately thereabove.

7. The heater according to claim 5, wherein the spacing supports are each one of a metal strip and a plastic strip, which strip is bent and is flexible, at least one section thereof extending approximately horizontally and being adjacent a bulge section thereof which is partially disposed beneath an upwardly extending section of the strip, thereby forming a receiving recess for the ring of a said support frame stacked immediately thereabove.

8. The heater according to claim 1, wherein said apertured plate is provided with holes of various sizes which are arranged to facilitate a precise regulation of the heat flow from the heat source to the food carrier.

9. The heater according to claim 2, wherein the first lever arm supporting the apertured plate can be adjusted to any desired angular position and is yieldably maintained there by means of the pressure of a spring.

10. The heater according to claim 2, including stop means cooperable with one of the lever and a pivot pin therefor for limiting pivotal movement of the lever.

11. The heater according to claim 1, including an upwardly opening wind-guard member which is supported around the heat source.

12. The heater according to claim 11, wherein the wind-guard member is of frusto-conical shape.

13. The heater according to claim 11 or 12, wherein a lower edge of the wind-guard member has slotlike recesses therein which facilitate lowering of the member from its normal operational position during stacking of the heaters through cooperation of the recesses and the support frame.

14. The heater according to claim 1, wherein said means for facilitating a releasable connection between the support frame and the food carrier includes holding hooks on the support frame; and wherein the heater includes means for supporting thereon food carriers such as plates which are too large to fit into the holding hooks of the support frame, including a ring which the holding hooks can grip and which has at least two and preferably three to five gripping members thereon cooperable with the food carrier, at least one of which is elastically tensioned.

* * * * *